Jan. 12, 1960 F. W. BURGER 2,920,603
ATTITUDE REFERENCE DEVICE
Filed Feb. 28, 1958 2 Sheets-Sheet 2
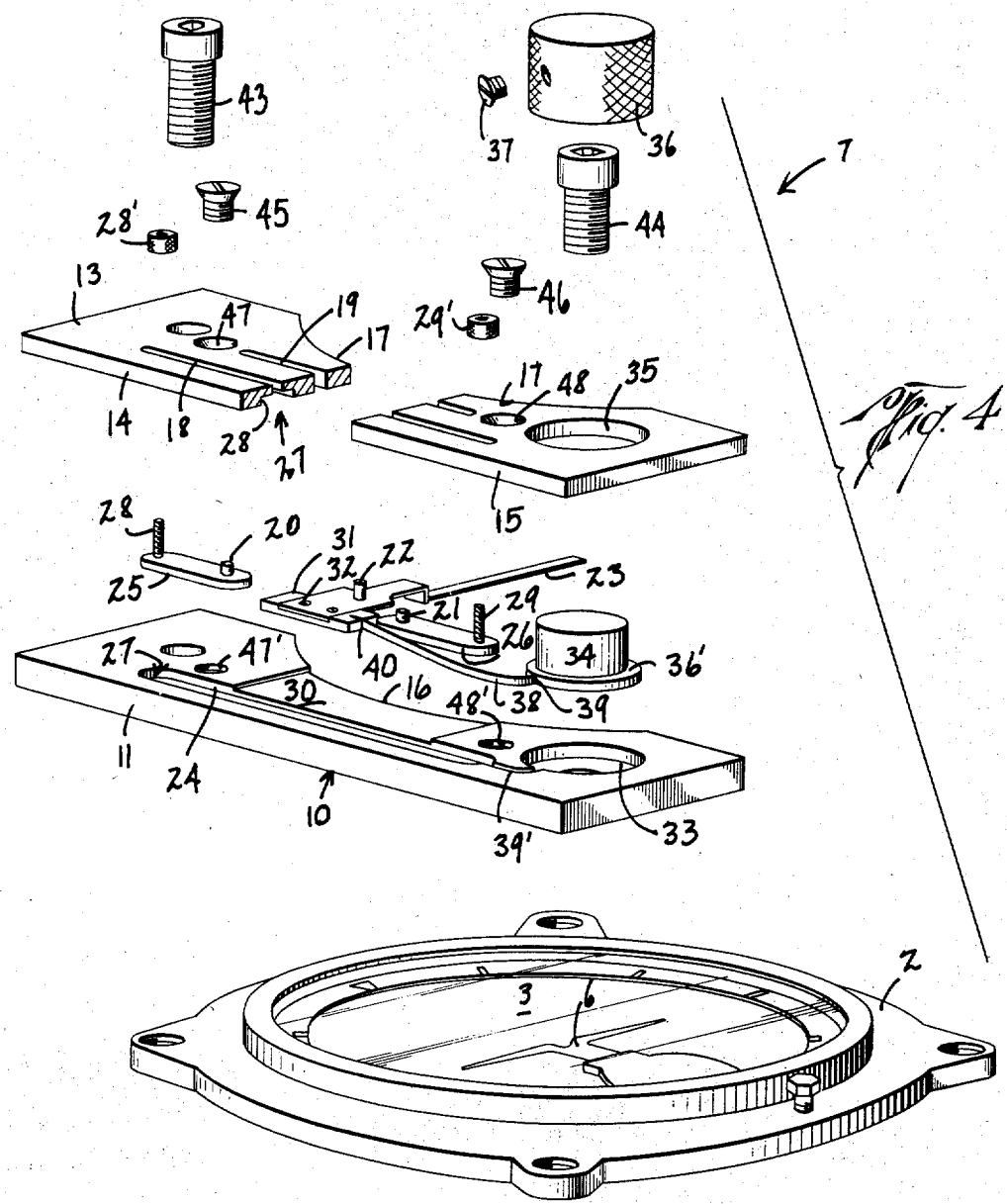
Fremont W. Burger
INVENTOR.
BY Hayden & Prauel
ATTORNEYS

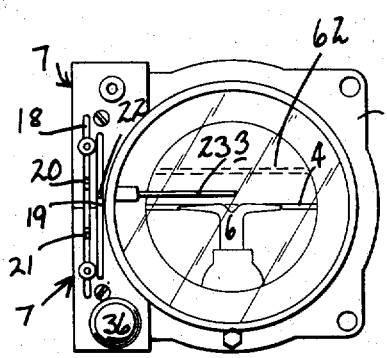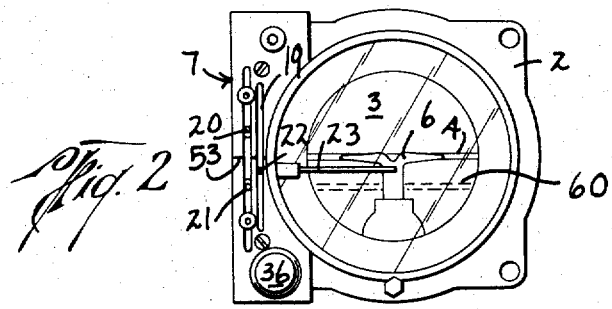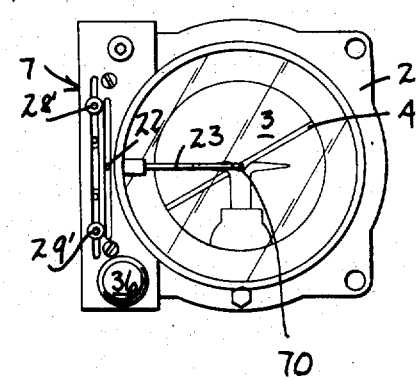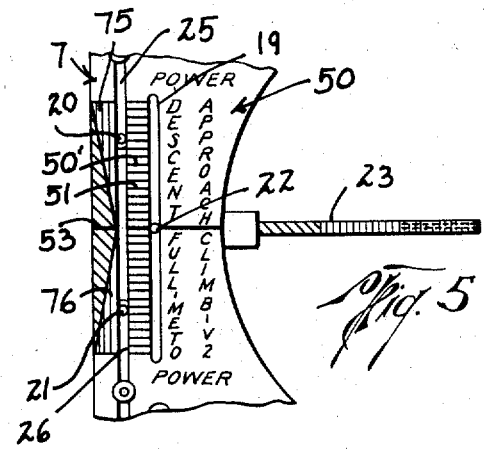
Fremont W. Burger
INVENTOR.

United States Patent Office 2,920,603
Patented Jan. 12, 1960

2,920,603

ATTITUDE REFERENCE DEVICE

Fremont W. Burger, Houston, Tex.

Application February 28, 1958, Serial No. 718,182

5 Claims. (Cl. 116—129)

The present invention relates to a visual indicating device adapted to be used with the attitude indicating instrument of an aircraft.

One of the instruments used at the present time in aircraft is an instrument designated as an attitude indicating instrument, which provides an artificial horizon in the cockpit of the plane to serve as a reference for the attitude of the craft. "Attitude" is a term generally used to define the angle between the longitudinal axis of the aircraft and the artificial horizon as indicated by the instrument in the aircraft.

The present invention relates to a manually operated visually indicating instrument for use in connection with the attitude instrument of an aircraft to indicate critical angles of pitch along the longitudinal axis of an airplane on the attitude instrument in the aircraft.

Still another object of the present invention is to provide a visual aid for indicating the critical angles of any particular aircraft on the attitude indicating instrument in an aircraft.

Other objects and advantages of the present invention will become more readily apparent from a consideration of the following description and drawings wherein:

Fig. 1 is a top plan view showing the present invention mounted on an attitude indicating instrument of an aircraft with the pointer moved to a pre-selected position above the horizon line;

Fig. 2 is a top plan view similar to Fig. 1 and indicates the pointer of the present invention moved to a pre-selected position below the artificial horizon line of the attitude instrument;

Fig. 3 is a top plan view similar to Fig. 1, and showing the pointer moved to another position relative to the attitude indicating instrument of the aircraft;

Fig. 4 is an exploded view illustrating the components of the present invention and their relationship to each other as well as their relationship to the face of an attitude indicating instrument; and Fig. 5 is an enlarged view showing suitable markings which may be provided on the visual indicating instrument of the present invention.

Attention is directed to Fig. 1 of the drawings wherein an attitude indicating instrument is denoted at 2 and is shown as including a window 3, whereby the movable artificial horizon 4 of the instrument 2 may be viewed. The artificial horizon 4 of the instrument 2 is provided and maintained by means of a gyroscope forming part of instrument 2. The details of construction of the attitude instrument 2 are well known, and it is believed unnecessary to give a detailed description thereof at this time. An aircraft is represented at 6 in the instrument 2 and is normally in alignment with the artificial horizon 4.

The present invention is illustrated generally at 7 in Figs. 1, 2 and 3, and provides a means for manually setting a pointer reference to indicate angles of pitch along the longitudinal axis of the aircraft in relation to the artificial horizon 4 as indicated on the instrument 2.

The construction of the instrument 7 is shown in detail in Fig. 4, wherein one form or embodiment is illustrated. The attitude instrument of the aircraft is indicated at 2 and the window thereof is shown at 3, with the fixed simulated aircraft shown at 6.

The present invention includes a body designated generally at 10, which body includes the lower plate 11 and the upper plate 13, the latter comprising the two half portions 14 and 15. The plates 11 and 13 are secured together to form the body 10 and provide a support for the components of the present invention, as will be more fully described hereinafter. It will be noted that the plates 11, 14 and 15 are cut-away along one edge as illustrated at 16 and 17, respectively, so that when the device is positioned adjacent the instrument 2 as shown in Figs. 1, 2 and 3, it will fit adjacent the window 3 so as to not interfere with visual observation of the artificial horizon 4, by the pilot of the aircraft. The upper plate 13 of the body 10 is provided with two longitudinally extending slots 18 and 19, the slot 18 serving to accommodate the indices 20 and 21, support index plates 25 and 26 respectively, and the slot 19, serving to accommodate the pin index 22 which projects upwardly from the pointer 23, as will be described in more detail hereinafter.

It will be noted that the bottom plate 11 of the body 10 is recessed longitudinally as illustrated at 24 to accommodate the index plates 25 and 26, upon which are mounted each of the indices 20 and 21 respectively, and it will be further noted that the top plates 14 and 15 are suitably recessed as illustrated at 28, which recess 28 in the top plates 14 and 15 coincides with the recess 24 in the bottom plate 11, whereby a suitable longitudinal groove 27 for receiving the index support plates 25 and 26 is provided when the plates 11 and 13 are secured together. Each of the index support plates 25 and 26 is provided with a threaded projection 28 and 29, which extends upwardly through the slot 18 and is adapted to receive the nuts 28' and 29' respectively thereon. It can be appreciated that the flat index carrier plates 25 and 26 are slidable within the groove 27 so that the indices 20 and 21 can be moved to various positions within the slot 18 to visually indicate their position within the slot 18. The nuts 28' and 29' may be tightened against the upper surface of the half plates 14 and 15 in order to retain their respective index plates at any desired position longitudinally of body 10 and in slot 18.

The pointer 23 extends laterally from the body 10 and is adapted to be positioned over the window 3 of the instrument 2, as shown in Figs. 1, 2 and 3 of the drawings. A recess 30 is provided which extends longitudinally of the body 10, and is adapted to receive the carrier 31 for the pointer 23. The pointer 23 may be fixed to the carrier 31 by any suitable means such as screws 32 or the like. The index 22 is secured to the pointer 23 and projects upwardly therefrom through the slot 19 to indicate the position of the pointer in the slot 19 as it is moved longitudinally of the body 10.

It can be appreciated that in an instrument of this type, it is subjected to tremendous vibration during use in an aircraft, and it is therefore necessary that suitable means be provided so that when the pointer 23 is moved to a pre-selected position relative to the window 3 of the instrument 2, it will remain in such position, notwithstanding vibration or shock to the aircraft due to air turbulence, or due to vibration imparted to the aircraft from the mechanical components thereof, such as the motors and the like. To this end, it has been found desirable to utilize a particular configuration for moving the pointer 23 as shown in the drawings in Fig. 4.

A recess 33 is provided in the lower plate portion 11, which is adapted to receive the rotatable member 34 therein. An opening 35 is provided in the plate 15, through which the rotatable member 34 is adapted to be received and is retained within the recess 33 in the plate 10, since the opening 35 overlies the shoulder 36' on the member 34, whereby rotation can be imparted to the member 34 by means of the knurled cap 36 adapted to be positioned over the member 34 and retained in position thereon by any suitable means such as the screw 37, which fits through the cap 36.

Strip spring means 38 is connected at one end as shown at 39 to the member 34, and is secured to the carrier 31 at its other end 40. A groove 39' connects the recess 33 with the recess 24 which receives the strip spring member 38 therein. The strip springs 38 may be formed of suitable resilient material such as thin metal or the like, so that as the member 34 is rotated in one direction, the strip member 38 moves within the groove 39' and winds around the member 34 to move the carrier 31 and pointer 23 longitudinally of the body 10. Similarly, when the member 34 is rotated in an opposite direction, the carrier 31 and the pointer 23 will also be moved longitudinally of the body 10 until the index 22 on the pointer 23 is at the pre-selected or desired indication in the slot 19 for visually indicating to the pilot of the aircraft a predetermined angle of the longitudinal axis of the aircraft relative to the artificial horizon.

Suitable means such as screws 43 and 44 may be engaged through the body 10 for positioning the device 7 adjacent an attitude indicating instrument 2.

To assemble the components of the present invention, it is only necessary to place the index plates 25 and 26 within the recess 24 of bottom plate 11, to also place the member 34 with the strip spring 38 and the pointer carrier 31 in their respective positions on the lower plate 11, whereupon the two upper plate portions 14 and 15 may be placed thereon, and screws 45 and 46 secured through the openings 47 and 48 in the upper plates 14 and 15 and through the threaded openings 47' and 48' in the lower plate 11, whereupon the indices 20 and 21 project upwardly through the longitudinally extending slots 18, and the index 22 on the pointer 23 projects upwardly within the slot 19, which is parallel to the slot 18. The pointer 23 extends laterally of the body 10 and over the window 3 of the instrument 2. It should be noted that the pointer 23 is in fixed horizontal relation relative to the movable horizon 4 so that in normal position of the movable horizon 4, that is, when it is parallel to the horizon of the earth, the pointer 23 will be parallel to the artificial horizon 4.

The present invention has particular value in indicating to the pilot of the aircraft, various critical angles of the aircraft which otherwise would have to be retained mentally.

For example, with each type of aircraft, there is a minimum take-off safety speed generally termed in the art as the $V_2$ speed. This is a speed for the particular aircraft at which it has been demonstrated that the aircraft will effect a climb-out with one engine inoperative. This speed is a known speed for each type of aircraft and it is the speed of the craft, with the critical engine out of operation which will still enable the airplane to maintain proper ascent during take-off. It can be appreciated that the speed of an aircraft under such circumstances will naturally be related to the attitude of the aircraft, and if the attitude angle is increased, there is more of a tendency for the airplane to stall. This, of course, presents a great danger to the operator of the aircraft, as well as the occupants, since the normal reaction of the operator of the aircraft would be to put the nose of the aircraft down to try to gain additional speed with the remaining engine or engines. Of course, when the nose of the aircraft is pointed toward the earth, the speed is greatly increased and often such procedures have caused aircrafts to crash. However, if the pilot maintains the attitude and speed (of the remaining engines) at a predetermined point, the aircraft will continue to climb during take-off even with one engine out. However, the attitude of the craft cannot exceed a predetermined amount because if it becomes too great for the particular design of aircraft, the aircraft will stall and crash.

By way of illustration, let it be assumed that a particular type of aircraft with two motors is in the procedure of taking off, and that the critical engine goes out during take-off. If it be assumed that the minimum single engine speed of the plane is 95 miles per hour, then this is referred to as the $V_2$ speed of the plane, and the plane will not climb until it reaches or exceeds this minimum single engine speed. Furthermore, the plane will not climb even if this critical speed is reached if the attitude of the plane is too great. That is, if the attitude is too great, then the plane stalls, and if the attitude is not great enough, the plane will climb, but it will not meet minimum climb requirements set by the governmental authorities for aircraft. If the climb rate of the aircraft is not sufficient, under such conditions then it may hit obstructions as it takes off.

Therefore, the speed and climb rate of any aircraft under the circumstances in this example are critical and are related to each other.

For purposes of further illustration, it should be assumed that the plane of the above example is just rising off the ground and is ascending at a satisfactory rate with a speed of 120 miles per hour when the critical engine cuts out. Unless the operator of the aircraft remembers that the minimum single engine speed of the particular ship that he is in is 95 miles per hour, and also remembers the proper attitude at this speed, it is possible that a crash will ensue because the normal reaction for the pilot is to put the nose of the ship down when a motor goes out in order to gain speed. While this action immediately increases the speed of the plane, lift of the plane is thereby decreased momentarily so that the plane actually increases its speed toward the ground under such circumstances and during the critical take-off period. On the other hand, a second possible normal reaction would be for the pilot to try to increase the rate of climb (even with one less motor), which will cause loss of directional control in the ship if the attitude becomes too great for the available power. If the pilot loses directional control of the ship, a crash will ensue.

The above illustration can be applied to any type of aircraft with any number of motors. Of course, as previously mentioned the $V_2$ speed and rate of climb for each design of aircraft is different and, therefore, the critical attitude and speed for each aircraft design is different. The pilot could set the pointer 23 at the $V_2$ speed of any aircraft during take-off which would automatically visually indicate to the pilot the critical attitude of the aircraft should the critical motor go out. Therefore, if the critical motor cuts out, the pilot by maintaining full power on the remaining engine or engines and by aligning the horizon bar 4 with the pointer 23 which has been previously set at the $V_2$ speed, can maintain a rate of climb which will permit him to take off and reach an altitude so that he can maneuver safely above obstructions in the area in order to make a proper landing. Similarly, other critical operational characteristics could be shown on the instrument 7 by moving the indices 20 and 21 to the desired critical characteristics which the pilot wishes to have visually demonstrated.

Figs. 1, 2 and 3 illustrate the use of the present invention in connection with an attitude indicating instrument to show visually to the operator of the aircraft, the critical angles in connection with any particular type of aircraft.

For example, attention is directed to Fig. 5, wherein a scale is indicated generally at 50 for use with the present invention and is illustrated as being marked on the upper surface of plates 14 and 15. The scale illustrated at 50' may be designated in terms of miles per hour, or merely may be in the form of index markings 51 as shown in the drawing. To further aid the visual indication of the device, it will be noted that the words "approach" and "descent" are written above the line 53, which is coincident with the movable horizontal line 4 at its normal position, while the words "climb—$V_2$" "full—meto" are written below the line 53.

It will be further noted that a red marking or portion is provided at 75 and 76 extending above and below the line 53 respectively. As the aircraft takes off, the artificial horizon line 4 moves progressively downwardly on the instrument 2, assuming the aircraft is climbing. This will cause the horizon bar 4 to move into the wider portion of the red marking, and the lower the bar 4 moves on the instrument, the more red there is adjacent the bar 4 indicating visually to the pilot that caution is to be exercised to avoid too much attitude which might cause the aircraft to stall.

Similarly, when the aircraft is approaching for a landing, the bar 4 moves toward the top of window 3 as viewed in Fig. 1, and also moves into the wider red portion 75 above the line 53. This serves as a visual warning to the pilot to prevent too steep an approach which might cause the ship to crash.

In Fig. 2, the pointer 23 is illustrated as having been moved below the line 53, and to a position adjacent the scale 51, which is the $V_2$ speed of the particular aircraft in which the device 7 is installed. If the instrument is used in the two motored aircraft, of the example given above, then the pointer 23 and its index 22 would be set adjacent the scale 51 at the point "95 miles per hour," which is the $V_2$ speed of the aircraft.

It can be appreciated that the fixed aircraft designation 6 remains stationary while the movable horizon 4 moves relative thereto when an aircraft is taking off, landing, or in the air. The movable horizon 4 during take-off may move to a point below the pointer 23, such as that represented by the dotted line at 60 in Fig. 2; however, if the critical engine of the aircraft cuts out, the pilot may immediately, by visual reference to the pointer 23, permit the aircraft to assume a relation or attitude so that the movable horizon 4 aligns with the pointer 23, which is the minimum take-off speed of the airplane. When thus aligned, the aircraft will continue its proper ascend during take-off operations without fear of stalling or crashing.

Similarly, when the aircraft is coming in for a landing it can be appreciated that there is a proper angle, or an attitude for each aircraft design which must not be exceeded to prevent crashing of the plane as it lands. As the aircraft approaches for a landing, the speed is related to the angle of the plane relative to the artificial horizon, so that if the angle is great, the aircraft is approaching the earth at a greater speed. In order to aid the pilot to maintain a proper angle relative to the earth, upon a landing approach, should some unnatural occurrence, such as a motor cut-out, take place during the landing operation, the pilot may move the pointer 23 to the proper speed of the aircraft or angle which must be maintained in order to provide a safe landing. Therefore, if the movable horizon 4 never moves above the pointer, such as represented by the dotted line 62 in Fig. 1, when a critical engine is out during a landing operation, the pilot will know that he is approaching at a safe angle and speed.

In Fig. 3, the pointer 23 is moved to the center of the window 3 of the instrument 2, and it will be noted that the horizon line 4 is at an angle, which indicates that the aircraft is in a turn. In order to indicate to the pilot that the turn is being made without a loss or gain of altitude, the pointer 23 may be moved to the position illustrated in Fig. 3 of the drawings, and if the horizon line 4 be maintained as shown in Fig. 3, then the pilot can be assured that a turn is made without either ascent or descend of the plane. It will be noted that the pointer 23 terminates at the center of window 3 of instrument 2, so that when the artificial horizon 4 is maintained at the position relative to pointer 23 as shown at 70 in Fig. 3, the aircraft is merely turning, it is not gaining or losing altitude.

Each of Figs. 1, 2 and 3 also show the indices 20 and 21 in the slot 18. It can be appreciated that these indices can be moved to any of the various critical speeds or operational characteristics for a plane, merely by loosening the nuts 28' and 29', and pushing the index carrier 25 or 26 along the groove 27 to position the index 20 or the index 21 longitudinally of the slot 18. The indices 20 and 21 may be locked in position by tightening nuts 28' and 29' against body 10. The knob 36 serves to move the pointer 23 longitudinally of the body, and the index 22, which is aligned with the longitudinal axis of the pointer 23, can be positioned adjacent the scale 51 on the device 7.

It can be appreciated that it is impossible for an aircraft operator to remember all of the critical characteristics of a particular type of aircraft so that in an emergency situation, it is impossible to maintain the necessary speeds or attitudes of the plane in order to prevent crashing. The present invention provides a visual indicator for the pilot which may be positioned on an attitude indicating instrument, and is adapted to be moved to visually indicate to the pilot various critical characteristics of the craft being operated. The construction and arrangement of the instrument is such that it can be readily adjusted to indicate a number of various characteristics of any particular craft, and it can be adjusted for the characteristics which differ from one plane to another.

Of course, the present invention can be used in cooperation with the attitude indicating instrument of an aircraft during normal flight operations, as well as in emergency situations. By way of example, the present invention can be readily used with radio aids to navigation for instrument approaches.

The instrument landing glide slope is generally six and one-half degrees and, therefore, for any power setting or approach speed of an aircraft, the rate of descent of the airplane must be maintained constant and in a proper relationship relative to the glide slope of the instrument landing system. Since for any given power setting or approach speed of an aircraft, the rate of descent of the aircraft is known, then for any given power setting, a rate of descent of the craft can be established which will give the aircraft a proper attitude to align it relative to the instrument landing glide slope. The attitude which will give a constant and proper rate of descent may be visually indicated by moving the pointer 23 to the proper position on the attitude indicating instrument 2 of the aircraft and by thereafter aligning the movable gyro horizon bar 4 with the pointer 23 by maneuvering the aircraft accordingly. When the bar 4 and pointer 23 are thus aligned, the aircraft will assume a proper relationship relative to the instrument glide slope and will maintain a constant rate of descent so as to make a proper landing.

Broadly, the present invention relates to an instrument to be used with an attitude indicating instrument, and more particularly to a device of relatively simple construction, which is fool-proof in operation to visually indicate to the operator of an aircraft certain desirable critical operating characteristics of the aircraft.

What is claimed is:

1. A device for use with an aircraft attitude indicator instrument to manually indicate critical angles of pitch along the longitudinal axis of an aircraft including, a body adapted to be positioned at one side of and adjacent the attitude instrument of an aircraft, paired slots extending longitudinally and in parallel relation in said body, a pointer extending laterally from said body, means for moving said pointer longitudinally of said body, pin means extending from said pointer and adapted to move in one of said slots, which pin means is aligned with the longitudinal axis of said pointer to indicate the position of said pointer in said slot, and indices movably mounted in said other slot to indicate selective positions with which said pointer pin may be aligned.

2. The combination recited in claim 1 wherein said pointer moving means includes, a knob rotatably mounted in said body, strip spring means engaged with said knob and secured to said pointer at its other end, there being a longitudinally extending recess in said body to accommodate movement of said pointer, said knob adapted to rotate whereupon said strip spring means moves in response thereto to urge said pointer longitudinally of said body.

3. The combination recited in claim 1 wherein said indices include means to lock them in any selected position in said slot.

4. A device for use with an aircraft attitude indicator instrument to manually indicate critical angles of pitch along the longitudinal axis of an aircraft including, a body adapted to be positioned at one side of and adjacent the attitude instrument of an aircraft, paired slots extending longitudinally and in parallel relation in said body, a pointer extending laterally from said body, means for moving said pointer longitudinally of said body, pin means extending from said pointer and adapted to move in one of said slots, which pin means is aligned with the longitudinal axis of said pointer to indicate the position of said pointer in said slot, indices movably mounted in said other slot to indicate selective positions with which said pointer pin may be aligned, a threaded pin extending upwardly through said body from each index and adapted to move in said slot, a nut threadedly engaged therewith whereby said indices may be moved along said slot and locked in any position therein by screwing said nut against said body.

5. The combination recited in claim 4 wherein said pointer moving means includes, a knob rotatably mounted in said body, strip spring means engaged with said knob and secured to said pointer at its other end, there being a longitudinally extending recess in said body to accommodate movement of said pointer, said knob adapted to rotate whereupon said strip spring means moves in response thereto to urge said pointer longitudinally of said body.

References Cited in the file of this patent
FOREIGN PATENTS 603,383     Great Britain _____ June 15, 1948